(12) United States Patent
Hamamoto et al.

(10) Patent No.: US 7,976,988 B2
(45) Date of Patent: Jul. 12, 2011

(54) NON-AQUEOUS ELECTROLYTE AND LITHIUM SECONDARY BATTERY USING THE SAME

(75) Inventors: Toshikazu Hamamoto, Ube (JP); Koji Abe, Ube (JP); Tsutomu Takai, Ube (JP)

(73) Assignee: UBE Industries, Ltd., Yamaguchi (JP)

( * ) Notice: Subject to any disclaimer, the term of this patent is extended or adjusted under 35 U.S.C. 154(b) by 411 days.

(21) Appl. No.: 11/699,327

(22) Filed: Jan. 30, 2007

(65) Prior Publication Data

US 2007/0207389 A1 Sep. 6, 2007

(51) Int. Cl.
*H01M 10/0567* (2010.01)
*H01M 10/0569* (2010.01)
*H01M 6/16* (2010.01)

(52) U.S. Cl. ............ 429/340; 429/231.8; 429/314; 429/332; 429/338

(58) Field of Classification Search .......... 429/311, 429/314, 326, 340, 329–338, 347, 231.8
See application file for complete search history.

(56) References Cited

U.S. PATENT DOCUMENTS

| | | | |
|---|---|---|---|
| 3,144,383 A | 8/1964 | Aichenegg et al. | |
| 5,219,679 A | 6/1993 | Abraham et al. | |
| 5,474,860 A | 12/1995 | Abraham et al. | |
| 5,626,981 A | 5/1997 | Simon et al. | |
| 6,245,465 B1 | 6/2001 | Angell et al. | |
| 6,670,078 B1 | 12/2003 | Sato et al. | |
| 2001/0009744 A1 | 7/2001 | Kim et al. | |

FOREIGN PATENT DOCUMENTS

| | | |
|---|---|---|
| JP | 7-230825 | 8/1995 |
| JP | 09082360 A * | 3/1997 |
| JP | 10-199570 | 7/1998 |
| JP | 11-214001 | 8/1999 |
| JP | 11329494 A * | 11/1999 |

OTHER PUBLICATIONS

Linden. Handbook of Batteries, p. 36.6, 1995.*
Hawley's Condensed Chemical Dictionary (11th ed) 576 (1987).
NIST Chemistry WebBook printout for Divinyl Sulphone (1991) (no month).
Linden, Handbook of Batteries, pp. 36.4-36.5 (1995).
Aurbach et al. "A comparative study of synthetic graphite and Li electrodes in electrolyte solutions based on ethylene carbonate-dimethyl carbonate mixtures" J. Electrochem. Soc. 143(12): 3809-3820 (1996).
Fong et al. "Studies of lithium intercalation into carbons using nonaqueous electrochemical cells" J. Electrochem. Soc. 137(7): 2009-2013 (1990).
Peled et al. "Advanced model for solid electrolyte interphase electrodes in liquid and polymer electrolytes" J. Electrochem. Soc. 144(8): L208-L210 (1997).
Takei et al. "An x-ray photoelectron spectroscopy study on the surface film on carbon black anode in lithium secondary cells" Journal of Power Sources 54: 171-174 (1995).

\* cited by examiner

*Primary Examiner* — Tracy Dove
(74) *Attorney, Agent, or Firm* — Morgan, Lewis & Bockius LLP

(57) ABSTRACT

A non-aqueous electrolyte comprising (i) a non-aqueous solvent, especially mainly composed of a cyclic carbonate and a cyclic ester and optionally a linear carbonate, and (ii) an electrolyte salt, especially $LiBF_4$, dissolved therein and (iii) a vinyl sulfone derivative having the formula (I):

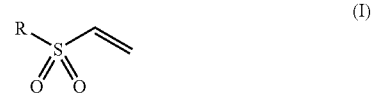

(I)

wherein R indicates a $C_1$ to $C_{12}$ alkyl group, $C_2$ to $C_{12}$ alkenyl group, or $C_3$ to $C_6$ cycloalkyl, and also a lithium secondary battery using the same are disclosed.

3 Claims, No Drawings

NON-AQUEOUS ELECTROLYTE AND LITHIUM SECONDARY BATTERY USING THE SAME

BACKGROUND OF THE INVENTION

1. Field of the Invention

The present invention relates to a non-aqueous electrolyte capable of providing a lithium secondary battery having superior battery cycle characteristic and battery characteristics such as electrical capacity, storage characteristic, and also relates to a lithium secondary battery using the same.

2. Description of the Related Art

In recent years, lithium secondary batteries have been widely used as the power sources for driving compact electronic devices etc. Lithium secondary batteries are mainly composed of a cathode, a non-aqueous electrolyte and an anode. In particular, a lithium secondary battery having a lithium complex oxide such as $LiCoO_2$ as a cathode and a carbonaceous material or lithium metal as an anode is suitably used. Further, as the non-aqueous electrolyte for a lithium secondary battery, a composition comprising a combination of a cyclic carbonate such as ethylene carbonate (EC) or propylene carbonate (PC) and a linear carbonate such as dimethyl carbonate (DMC), methylethyl carbonate (MEC), and diethyl carbonate (DEC) is suitably used.

However, a secondary battery having more superior battery cycle characteristic and battery characteristics such as electrical capacity has been desired. A lithium secondary battery using a highly crystallized carbonaceous material such as natural graphite or artificial graphite as the anode sometimes suffer from breakdown of the electrolyte at the anode and an increase in the irreversible capacity or in some cases peeling of the carboneous material occur. The increase in the irreversible capacity or the peeling of the carbonaceous material occurs due to the decomposition of the solvent in the electrolyte during the charge thereof and is due to the electrochemical reduction of the solvent at the interface between the carbonaceous material and the electrolyte. In particular, PC having a low melting point and high dielectric constant has a high electroconductivity even at a low temperature. Nevertheless, when a graphite anode is used, there are problems that the PC cannot be used for the lithium secondary battery due to the decomposition thereof. Further, EC partially decomposes during the repeated charge and discharge thereof so that the battery performance is decreased. Therefore, the battery cycle characteristic and the battery characteristics such as electrical capacity are not necessarily satisfied.

On the other hand, as the salt dissolved in the non-aqueous solvent, a lithium salt such as $LiClO_4$, $LiPF_6$ or $LiBF_4$ is used. A non-aqueous electrolyte containing such a non-aqueous solvent and the $LiPF_6$ dissolved therein is known to be high conductivity and high in the oxidation decomposition voltage of the $LiPF_6$, and therefore, is stable at high voltage.

However, $LiPF_6$ is inferior in heat stability, and therefore, there is the problem that the lithium salt is decomposed at a high temperature environment of 60° C. or more and the battery performances such as the cycle life under a high temperature environment are tremendously decreased. On the other hand, $LiBF_4$, which is superior to $LiPF_6$ in the heat stability, may be mentioned, but the ion conductivity that is inferior to that of $LiPF_6$. Thus, there is the problem that battery performance such as the cycle life is decreased under an ordinary temperature environment. Therefore, a cyclic ester such as γ-butyrolactone (GBL) is used due to the relatively high conductivity thereof. However, when GBL is used for a lithium secondary battery using a highly crystallized carbonaceous material such as natural graphite or artificial graphite as an anode, the GBL will electrochemically be decomposed at the graphite anode interface at the time of charging, and therefore, the battery performance will be decreased along with repeated use of charging and discharging. Thus, at the present time, the battery cycle characteristic and battery characteristics are not necessarily satisfactory.

SUMMARY OF THE INVENTION

The objects of the present invention are to solve the above-mentioned problems relating to an electrolyte for a lithium secondary battery and provide a non-aqueous electrolyte for a lithium secondary battery having superior the battery cycle characteristic and battery characteristics such as electrical capacity and a lithium secondary battery using the same.

In accordance with the present invention, there is provided a non-aqueous electrolyte comprising (i) a non-aqueous solvent and (ii) an electrolyte salt dissolved therein and (iii) a vinyl sulfone derivative having the formula (I):

(I)

wherein R indicates a $C_1$ to $C_{12}$ alkyl group, $C_2$ to $C_{12}$ alkenyl group, or $C_3$ to $C_6$ cycloalkyl group.

In accordance with the present invention, there is also provided a lithium secondary battery comprising (a) a cathode, (b) an anode and (c) a non-aqueous electrolyte comprising (i) a non-aqueous solvent and (ii) an electrolyte salt dissolved therein, and (iii) a vinyl sulfone derivative having the formula (I):

(I)

wherein R indicates a $C_1$ to $C_{12}$ alkyl group, $C_2$ to $C_{12}$ alkenyl group, or $C_3$ to $C_6$ cycloalkyl group.

In the preferred embodiments of the above non-aqueous electrolyte and the lithium secondary battery according to the present invention, the non-aqueous solvent is mainly composed of a cyclic carbonate, a cyclic ester, and optionally a linear carbonate and the electrolyte salt is $LiBF_4$.

BEST MODE FOR CARRYING OUT THE PRESENT INVENTION

The non-aqueous electrolyte of the present invention is used as a component member of a lithium secondary battery. The component members of the secondary battery other than the non-aqueous electrolyte are not particularly limited. The various component members used in the past may be used.

The vinyl sulfone derivative having the formula (I) contained in the electrolyte has a function of forming a passivation film at the surface of the carbonaceous material during the charging. Thus, it is believed that, when an active, highly crystallized carbonaceous material such as natural graphite or artificial graphite is covered with a passivation film, the decomposition of the electrolyte is suppressed without impairing normal reactions of the battery.

In the compound contained in the electrolyte comprised of a non-aqueous solvent and an electrolyte salt dissolved therein, the R in the vinyl sulfone derivative having the formula (I) is a $C_1$ to $C_{12}$ alkyl group, preferably a $C_1$ to $C_4$ alkyl group such as a methyl group, ethyl group, or propyl group. The alkyl group may be a branched alkyl group such as an isopropyl group or isobutyl group. Further, it may be a $C_2$ to $C_{12}$ alkenyl group, preferably $C_2$ to $C_6$ alkenyl group, such as a vinyl group or allyl group or a $C_3$ to $C_6$ cycloalkyl group such as a cyclopropyl group or cyclohexyl group.

As specific examples of the vinyl sulfone derivative having the formula (I) are divinyl sulfone (i.e., R=vinyl group in the formula (I)), ethylvinyl sulfone (i.e., R=ethyl group), isopropylvinyl sulfone (i.e., R=isopropyl group), cyclohexylvinyl sulfone (i.e., R=cyclohexyl group), etc. may be mentioned.

In the case of adding the vinyl sulfone derivative, if the content of the vinyl sulfone derivative (I) is too large, the conductivity of the electrolyte etc. are varied and the battery performance is decreased in some cases. Further, if the content is too small, a sufficient coating is not formed and the expected battery performance cannot be obtained. Therefore, the content is preferably in the range of 0.01 to 20% by weight, particularly 0.1 to 10% by weight, based upon the weight of the electrolyte.

The non-aqueous solvent used in the present invention is preferably composed of a high dielectric solvent and a low viscosity solvent.

Examples of the high dielectric solvent are cyclic carbonates such as ethylene carbonate (EC), propylene carbonate (PC), and butylene carbonate (BC). These high dielectric solvents may be used alone or in any mixture thereof.

Examples of the low viscosity solvent are a linear carbonate such as dimethyl carbonate (DMC), methylethyl carbonate (MEC), and diethyl carbonate (DEC), methylpropyl carbonate (MPC), butylmethyl carbonate (BMC), methylisopropyl carbonate (MIPC), isobutylmethyl carbonate (IBMC), sec-butylmethyl carbonate (SBMC) and tert-butylmethyl carbonate (TBMC); an ether such as tetrahydrofuran, 2-methyl tetrahydrofuran, 1,4-dioxane, 1,2-dimethoxyethane, 1,2-diethoxyethane, and 1,2-dibutoxyethane; a lactone such as γ-butyrolactone, a nitrile such as acetonitrile, an ester such as methyl propionate, and an amide such as dimethyl formamide. These low viscosity solvents may be used alone or in any mixture thereof.

The high dielectric solvent and low viscosity solvent may be freely selected and combined for use. It should be noted that the above high dielectric solvent and low viscosity solvent are used in a ratio of normally 1:9 to 4:1, preferably 1:4 to 7:3 by volume (i.e., high dielectric solvent:low viscosity solvent).

Examples of the electrolyte salt used in the present invention are $LiPF_6$, $LiBF_4$, $LiClO_4$, $LiN(SO_2CF_3)_2$, $LiN(SO_2C_2F_5)_2$, $LiC(SO_2CF_3)_3$, $LiPF_3(CF_3)_3$, $LiPF_3(C_2F_5)_3$, $LiPF_4(C_2F_5)_2$, $LiPF_5(iso-C_3F_7)$, $LiPF_4(iso-C_3F_7)_2$, etc. These salts may be used alone or may be used in any combination thereof. These salts are preferably used in concentrations of 0.1 to 3M, more preferably 0.5 to 1.5M.

The electrolyte of the present invention can be obtained by, for example, mixing the above-mentioned high dielectric solvent and low viscosity solvent, dissolving the electrolyte salt therein, and further dissolving the vinyl sulfone derivative having the formula (I) therein.

The non-aqueous solvent preferably used in the present invention contains at least one of ethylene carbonate, propylene carbonate, and butylene carbonate, as a cyclic carbonate, and contains γ-butyrolactone and/or γ-valerolactone as a cyclic ester.

By including a cyclic carbonate and cyclic ester and further optionally a linear carbonate as the non-aqueous solvent in the present invention, it is possible to improve the wettability of the separator, reduce the variation at the time of production of the batteries, and raise the production efficiency and possible to improve the cycle characteristic. As the linear carbonate, such as dimethyl carbonate (DMC), methylethyl carbonate (MEC), methylpropyl carbonate (MPC), butylmethyl carbonate (BMC), and diethyl carbonate (DEC) and a branched carbonate such as methylisopropyl carbonate (MIPC), isobutylmethyl carbonate (IBMC), sec-butylmethyl carbonate (SBMC), and tert-butylmethyl carbonate (TBMC) may be mentioned. These linear carbonates may be used alone or may be used in any combination thereof.

The cyclic carbonate and cyclic ester or further the linear carbonate are used suitably selected and combined. Note that as the non-aqueous solvent, the cyclic carbonate is used in an amount of 5 to 50% by volume, the cyclic ester 5 to 75% by volume, and the linear carbonate 0 to 70% by volume.

In the present invention, by using, in particular, a butylmethyl carbonate having a branched $C_4H_9$ group as the linear carbonate, it is possible to improve the wettability with respect to the separator and possible to efficiently inject the electrolyte in the production of a lithium battery.

As the butylmethyl carbonate having a branched $C_4H_9$ group, isobutylmethyl carbonate, sec-butylmethyl carbonate, and tert-butylmethyl carbonate may be mentioned. The content is preferably 10 to 70% by volume, based upon the non-aqueous electrolyte composed of the cyclic carbonate and cyclic ester and further optionally the linear carbonate.

As the salt used in the present invention, for example, $LiBF_4$ may be mentioned. This is used dissolved in the non-aqueous solvent at a concentration of usually 0.1 to 3M, preferably 0.5 to 1.5M.

The non-aqueous electrolyte of the present invention is obtained by, for example, mixing the cyclic carbonate and cyclic ester and optionally further the linear carbonate, dissolving the salt therein and dissolving the vinyl sulfone derivative having the formula (I).

As the cathode active material, a complex metal oxide of at least one metal selected from the group consisting of cobalt, manganese, nickel, chrome, iron, and vanadium with lithium is used. As such a complex metal oxide, for example, $LiCoO_2$, $LiMn_2O_4$, $LiNiO_2$, etc. may be mentioned.

The cathode is prepared by, for example, mixing the cathode active material with a conductive agent such as acetylene black or carbon black and a binder such as polytetrafluoroethylene (PTFE) and polyvinylidene fluoride (PVDF) and a solvent to make a cathode paste, then coating the cathode paste on a collector such as aluminum foil or a stainless steel foil or lath, drying, compression molding, then heat treating at a temperature of at 50 to 250° C. for about 2 hours in vacuum.

As the anode active material, lithium metal or a lithium alloy and a carbonaceous material having a graphite-type crystal structure capable of intercalate and disintercalate lithium (e.g., heat cracked carbons, coke, graphite (e.g., artificial graphite, natural graphite, etc.), an organic polymer compound sintered product, carbon fiber), a complex tin oxide, etc. may be used. In particular, a carbonaceous material having a graphite-type crystal structure having a lattice spacing ($d_{002}$) of the lattice face (002) of 0.335 to 0.340 nm is preferably used. Note that the powder material such as the carbonaceous material is mixed with a binder such as ethylenepropylene diene terpolymer (EPDM), polytetrafluoroethylene (PTFE), or polyvinylidene fluoride (PVDF) to make an anode paste.

The structure of the lithium secondary battery is not particularly limited. A coin battery having a cathode, anode, single layer or multiple layer separator and further a cylindrical battery, prismatic battery, etc. having a cathode, anode, and roll-shaped separator may be mentioned as examples. Note that as the separator, a known polyolefin porous film, woven fabric, nonwoven fabric, etc. is used.

EXAMPLES

The present invention will now be further explained in detail by, but is by no means limited to, the following Examples and Comparative Examples.

Example I-1

Preparation of Non-Aqueous Electrolyte

A non-aqueous solvent of PC:DMC (volume ratio)=1:2 was prepared, and $LiPF_6$ was dissolved therein to a concentration of 1M to prepare the electrolyte. Thereafter divinyl sulfone (i.e., R=vinyl group in the formula (I)) was added to 2.0% by weight, based upon the electrolyte as the vinyl sulfone derivative (i.e., additive).

Manufacture of Lithium Secondary Battery and Determination of Battery Characteristics 80% by weight of $LiCoO_2$ (i.e., a cathode active material), 10% by weight of acetylene black (i.e., a conductive agent), and 10% by weight of polyvinylidene fluoride (i.e., a binder) were mixed. Then, 1-methyl-2-pyrrolidone was added and mixed therewith. The resultant mixture was coated on an aluminum foil, dried, compression molded, and heat treated to form the cathode. 90% by weight-of natural graphite (i.e., an anode active material) and 10% by weight of polyvinylidene fluoride (i.e., a binder) were mixed. 1-methyl-2-pyrrolidone was added and mixed therewith. The resultant slurry was coated on a copper foil, dried, compression molded, and heat treated to form the anode. A separator of a polypropylene porous film was used and the above electrolyte was injected to prepare a coin battery (i.e., diameter 20 mm, thickness 3.2 mm).

The above coin type battery was charged at room temperature (20° C.) by a 0.8 mA constant current and constant voltage for 5 hours to an end voltage of 4.2v, then was discharged under a constant current of 0.8 mA to an end voltage of 2.7V. This charging and discharging was repeated. The initial charging and discharging capacity was about the same as with the case of use of 1M $LiPF_6$ EC:DMC (volume ratio)= 1:2 as an electrolyte (i.e., Comparative Example I-2). The battery characteristics after 50 cycles were determined, whereupon the retaining rate of the discharging capacity, when the initial discharge capacity was 100%, was 86.1%. Further, the low temperature characteristics were also good. The manufacturing conditions of the coin batteries and the battery characteristics of the same are shown in Table I-1.

Example I-2

The same procedure was followed as in Example I-1 except for using as the additive divinyl sulfone (i.e., R=vinyl group) in an amount of 0.5% by weight, based upon the electrolyte to prepare the electrolyte and prepare a coin battery. The battery characteristics were determined after 50 cycles, whereupon the discharge capacity retaining rate was 84.7%. The manufacturing conditions of the coin battery and the battery characteristics are shown in Table I-1.

Example I-3

The same procedure was followed as in Example I-1 except for using as the additive divinyl sulfone (i.e., R=vinyl group) in an amount of 8.0% by weight, based upon the electrolyte to prepare the electrolyte and prepare a coin battery. The battery characteristics were determined after 50 cycles, whereupon the discharge capacity retaining rate was 81.1%. The manufacturing conditions of the coin battery and the battery characteristics are shown in Table I-1.

Example I-4

The same procedure was followed as in Example I-1 except for using as the additive ethylvinyl sulfone (i.e., R=ethyl group) in an amount of 2.0% by weight, based upon the electrolyte to prepare the electrolyte and prepare a coin battery. The battery characteristics were determined after 50 cycles, whereupon the discharge capacity retaining rate was 85.7%. The manufacturing conditions of the coin battery and the battery characteristics are shown in Table I-1.

Comparative Example I-1

A non-aqueous solvent of PC:DMC (volume ratio)=1:2 was prepared, and $LiPF_6$ was dissolved therein to a concentration of 1M. At this time, no vinyl sulfone derivative was added. This electrolyte was used to prepare a coin battery in the same way as in Example I-1 and determine the battery characteristics. As a result, PC was decomposed at the initial charge and therefore, no discharge was effected. When the battery was observed by disassembling the same after the initial charge, the graphite anode was peeled off. The manufacturing conditions of the coin battery and the battery characteristics are shown in Table I-1.

Example I-5

A non-aqueous solvent of EC:DMC (volume ratio)=1:2 was prepared and $LiPF_6$ was dissolved therein to a concentration of 1M to prepare the electrolyte. Thereafter, as an additive divinyl sulfone (i.e., R=vinyl group) was added in an amount of 2.0% by weight, based upon the electrolyte. The electrolyte thus obtained was used and a coin battery was prepared in a manner as in Example I-1. The battery characteristics were determined after 50 cycles, the initial charge-discharge capacity is similar to the case where only 1M $LiPF_6$ EC:DMC (volume ratio)=1:2 was used as an electrolyte (i.e., Comparative Example I-2) and whereupon the discharge capacity retaining rate was 91.1%. The low temperature characteristics are good. The manufacturing conditions of the coin battery and the battery characteristics are shown in Table I-1.

Example I-6

The same procedure was followed as in Example I-5 except for using as the additive ethylvinyl sulfone (i.e., R=ethyl group) in an amount of 2.0% by weight, based upon the electrolyte and using MEC instead of DMC to prepare the non-aqueous electrolyte and prepare a coin battery. The battery characteristics were determined after 50 cycles, whereupon the discharge capacity retaining rate was 90.4%. The manufacturing conditions of the coin battery and the battery characteristics are shown in Table I-1.

Example I-7

The same procedure was followed as in Example I-5 except for using $LiMn_2O_4$, instead of $LiCoO_2$ and, using as an additive divinyl sulfone (i.e., R=vinyl group) in an amount of 3.0% by weight, based upon the electrolyte to prepare the electrolyte and prepare a coin battery. The battery characteristics were determined after 50 cycles, whereupon the discharge capacity retaining rate was 89.3%. The manufacturing conditions of the coin battery and the battery characteristics are shown in Table I-1.

Comparative Example I-2

A non-aqueous solvent of EC:DMC (volume ratio)=1:2 was prepared, and $LiPF_6$ was dissolved therein to a concentration of 1M. At this time, no vinyl sulfone derivative was added. This electrolyte was used to prepare a coin battery in the same way as in Example I-1 and determine the battery characteristics. The discharge capacity retaining rate after 50 cycles was 83.8% of the initial discharge capacity. The manufacturing conditions of the coin battery and the battery characteristics are shown in Table I-1.

molded, and heat treated to form the anode. A separator of a polypropylene porous film was used and the above electrolyte was injected to prepare a coin battery (i.e., diameter 20 mm, thickness 3.2 mm).

The above coin type battery was charged at room temperature (20° C.) by a 0.8 mA constant current and constant voltage for 5 hours to an end voltage of 4.2V, then was discharged under a constant current of 0.8 mA to an end voltage of 2.7V. This charging and discharging was repeated. The initial charging and discharging capacity was about the same as with the case of use of 1M $LiPF_6$ EC:GBL (volume ratio)=1:2 as an electrolyte (i.e., Comparative Example II-1). The battery characteristics after 50 cycles were determined, whereupon the retaining rate of the discharging capacity, when the initial discharge capacity was 100%, was 91.3%. Further, the low temperature characteristics were also good.

TABLE I-1

| | Cathode | Anode | Additive | Amount added (wt %) | Electrolyte composition (volume ratio) | 50 cycle discharge capacity retaining rate (%) |
|---|---|---|---|---|---|---|
| Ex. I-1 | $LiCoO_2$ | Natural graphite | Divinyl sulfone | 2.0 | 1M $LiPF_6$ PC/DMC = 1/2 | 86.1 |
| Ex. I-2 | $LiCoO_2$ | Natural graphite | Divinyl sulfone | 0.5 | 1M $LiPF_6$ PC/DMC = 1/2 | 84.7 |
| Ex. I-3 | $LiCoO_2$ | Natural graphite | Divinyl sulfone | 8.0 | 1M $LiPF_6$ PC/DMC = 1/2 | 81.1 |
| Ex. I-4 | $LiCoO_2$ | Natural graphite | Ethylvinyl sulfone | 2.0 | 1M $LiPF_6$ PC/DMC = 1/2 | 85.7 |
| Comp. Ex. I-1 | $LiCoO_2$ | Natural graphite | None | 0.0 | 1M $LiPF_6$ PC/DMC = 1/2 | Charge and Discharge Impossible |
| Ex. I-5 | $LiCoO_2$ | Natural graphite | Divinyl sulfone | 2.0 | 1M $LiPF_6$ EC/DMC = 1/2 | 91.1 |
| Ex. I-6 | $LiCoO_2$ | Natural graphite | Ethyvinyl sulfone | 2.0 | 1M $LiPF_6$ EC/MEC = 1/2 | 90.4 |
| Ex. I-7 | $LiMn_2O_4$ | Natural graphite | Divinyl sulfone | 3.0 | 1M $LiPF_6$ EC/DMC = 1/2 | 89.3 |
| Comp. Ex. I-2 | $LiCoO_2$ | Natural graphite | None | 0.0 | 1M $LiPF_6$ EC/DMC = 1/2 | 83.8 |

Example II-1

Preparation of Non-Aqueous Electrolyte

A non-aqueous solvent of EC:GBL (volume ratio)=1:2 was prepared, and $LiBF_4$ was dissolved therein to a concentration of 1M to prepare the non-aqueous electrolyte. Thereafter divinyl sulfone (i.e., R=vinyl group in the formula (I)) was added to 1.0% by weight, based upon the non-aqueous electrolyte as the vinyl sulfone derivative (i.e., additive).

Manufacture of Lithium Secondary Battery and Determination of Battery Characteristics 80% by weight of $LiMn_2O_4$ (i.e., a cathode active material), 10% by weight of acetylene black (i.e., a conductive agent) and 10% by weight of polyvinylidene fluoride (i.e., a binder) were mixed. Then, 1-methyl-2-pyrrolidone was added and mixed therewith. The resultant mixture was coated on an aluminum foil, dried, compression molded, and heat treated to form the cathode. 90% by weight of artificial graphite (i.e., an anode active material) and 10% by weight of polyvinylidene fluoride (i.e., binder) were mixed. 1-methyl-2-pyrrolidone was added and mixed therewith. The resultant mixture was coated on a copper foil, dried, compression The manufacturing conditions of the coin batteries and the battery characteristics of the same are shown in Table II-1.

Example II-2

The same procedure was followed as in Example II-1 except for using as the additive divinyl sulfone (i.e., R=vinyl group) in an amount of 0.3% by weight, based upon the electrolyte to prepare the non-aqueous electrolyte and prepare a coin battery. The battery characteristics were determined after 50 cycles, whereupon the discharge capacity retaining rate was 90.2%. The manufacturing conditions of the coin battery and the battery characteristics are shown in Table II-1.

Example II-3

The same procedure was followed as in Example II-1 except for using as the additive divinyl sulfone (i.e., R=vinyl group) in an amount of 5.0% by weight, based upon the electrolyte to prepare the non-aqueous electrolyte and prepare a coin battery. The battery characteristics were determined after 50 cycles, whereupon the discharge capacity retaining rate was 90.7%. The manufacturing conditions of the coin battery and the battery characteristics are shown in Table II-1.

Example II-4

The same procedure was followed as in Example II-1 except for preparing a non-aqueous solvent of EC-PC-GBL (volume ratio=35:5:60), dissolving $LiBF_4$ therein to a concentration of 1M to prepare a non-aqueous solvent, then using as an additive divinyl sulfone (i.e., R=vinyl group) in an amount of 2.0% by weight, based upon the non-aqueous electrolyte to prepare the non-aqueous electrolyte and prepare a coin battery. The battery characteristics were determined after 50 cycles, whereupon the discharge capacity retaining rate was 90.4%. The manufacturing conditions of the coin battery and the battery characteristics are shown in Table II-1.

Example II-5

The same procedure was followed as in Example II-1 except for preparing a non-aqueous solvent of EC-GBL-IBMC (volume ratio)=30:50:20, and $LiBF_4$ was dissolved therein to a concentration of 1M to prepare a non-aqueous solvent, then using as an additive divinyl sulfone (i.e., R=vinyl group) in an amount of 2.0% by weight, based upon the non-aqueous electrolyte to prepare the non-aqueous electrolyte and prepare a coin battery. The battery characteristics were determined after 50 cycles, whereupon the discharge capacity retaining rate was 91.8%. The manufacturing conditions of the coin battery and the battery characteristics are shown in Table II-1.

The wettability of the separator by this electrolyte was determined, whereupon the contact angle was 50.4 degrees.

Example II-6

The same procedure was followed as in Example II-1 except for using natural graphite instead of artificial graphite as the anode active substance and preparing a non-aqueous solvent of EC-GBL-IBMC (volume ratio)=30:50:20, dissolving $LiBF_4$ therein to a concentration of 1M to prepare a non-aqueous solvent, then using as an additive divinyl sulfone (i.e., R=vinyl group) in an amount of 2.0% by weight, based upon the non-aqueous electrolyte to prepare the non-aqueous electrolyte and prepare a coin battery. The battery characteristics were determined after 50 cycles, whereupon the discharge capacity retaining rate was 91.5%. The manufacturing conditions of the coin battery and the battery characteristics are shown in Table II-1.

The wettability of the separator by this electrolyte was determined, whereupon the contact angle was 50.4 degrees.

Comparative Example II-1

A non-aqueous solvent of EC:GBL (volume ratio)=1:2 was prepared, and $LiBF_4$ was dissolved therein to a concentration of 1M. At this time, no vinyl sulfone derivative was added. This non-aqueous electrolyte was used to prepare a coin battery in the same way as in Example II-1 and determine the battery characteristics. The discharge capacity retaining rate after 50 cycles was 65.6% of the initial discharge capacity. The manufacturing conditions of the coin battery and the battery characteristics are shown in Table II-1. The wettability of the separator by this non-aqueous electrolyte was determined, whereupon the contact angle was 77.2 degrees, i.e., the wettability was poor.

TABLE II-1

| | Cathode | Anode | Additive | Amount added (wt %) | Electrolyte composition (volume ratio) | 50 cycle discharge capacity retaining rate (%) |
|---|---|---|---|---|---|---|
| Ex. II-1 | $LiMn_2O_4$ | Artificial graphite | Divinyl sulfone | 1.0 | 1M $LiBF_4$ EC/GBL = 1/2 | 91.3 |
| Ex. II-2 | $LiMn_2O_4$ | Artificial graphite | Divinyl sulfone | 0.3 | 1M $LiBF_4$ EC/GBL = 1/2 | 90.2 |
| Ex. II-3 | $LiMn_2O_4$ | Artificial graphite | Divinyl sulfone | 5.0 | 1M $LiBF_4$ EC/GBL = 1/2 | 90.7 |
| Ex. II-4 | $LiMn_2O_4$ | Artificial graphite | Divinyl sulfone | 2.0 | 1M $LiBF_4$ EC/PC/GBL = 35/5/60 | 90.4 |
| Ex. II-5 | $LiMn_2O_4$ | Artificial graphite | Divinyl sulfone | 2.0 | 1M $LiBF_4$ EC/GBL/IBMC = 30/50/20 | 91.8 |
| Ex. II-6 | $LiMn_2O_4$ | Natural graphite | Divinyl sulfone | 2.0 | 1M $LiBF_4$ EC/GBL/IBMC = 30/50/20 | 91.5 |
| Comp. Ex. II-1 | $LiMn_2O_4$ | Artificial graphite | None | 0.0 | 1M $LiBF_4$ EC/GBL = 1/2 | 65.6 |

In the present invention, the wettability of the separator by the electrolyte was determined by the following apparatus. The measurement conditions were an atmosphere of a temperature of 23° C. and a humidity of 50%. The contact angle immediately after formation of liquid drops was determined for a separator upon which the non-aqueous electrolyte was dropped. The measurement apparatus was an image processing type contact angle meter Model CA-X made by Kyowa Kaimen Kagaku K. K. The smaller the determined contact angle, the better the wettability of permeability of the separator by the non-aqueous electrolyte.

Note that the present invention is not limited to the described Examples. Various combinations easily deducible from the gist of the invention are also possible. In particular, the combinations of solvents in the Examples are not limitative. Further, the above Examples related to coin batteries, but the present invention may also be applied to cylindrical batteries and prismatic battery.

According to the present invention, it is possible to provide a lithium secondary battery having superior battery cycle characteristic and battery characteristics such as electrical capacity, storage characteristic.

The invention claimed is:
1. A lithium secondary battery comprising
   (a) a cathode and
   (b) an anode composed of a carbonaceous material having a graphite-type crystal structure having a lattice spacing ($d_{002}$) of the lattice face (002) of 0.335 to 0.340 nm,
   wherein the anode contains on its surface a passivation film, wherein the passivation film is formed from a non-aqueous electrolyte comprising
      (i) a non-aqueous solvent comprising a mixture of a high dielectric solvent and a low viscosity solvent at a volume ratio of 1:4 to 7:3, wherein the high dielectric solvent is at least one cyclic carbonate selected from the group consisting of ethylene carbonate (EC), propylene carbonate (PC) and butylene carbonate (BC), and wherein the low viscosity solvent is at least one solvent selected from the group consisting of dimethyl carbonate (DMC), methylethyl carbonate (MEC) and diethyl carbonate (DEC);
      (ii) an electrolyte salt comprising $LiPF_6$, dissolved therein; and
      (iii) 0.1 to 3% by weight, based upon the weight of the electrolyte, of divinyl sulfone.

2. A lithium secondary battery as claimed in claim 1, wherein the electrolyte salt contains $LiPF_6$ and at least one compound selected from the group consisting of $LiBF_4$, $LiClO_4$, $LiN(SO_2CF_3)_2$, $LiN(SO_2C_2F_5)_2$, and $LiC(SO_2CF_3)_3$.

3. A lithium secondary battery as claimed in claim 1, wherein the content of the divinyl sulfone is 0.1 to 2% by weight, based upon the weight of the electrolyte.

* * * * *